Figure 1:
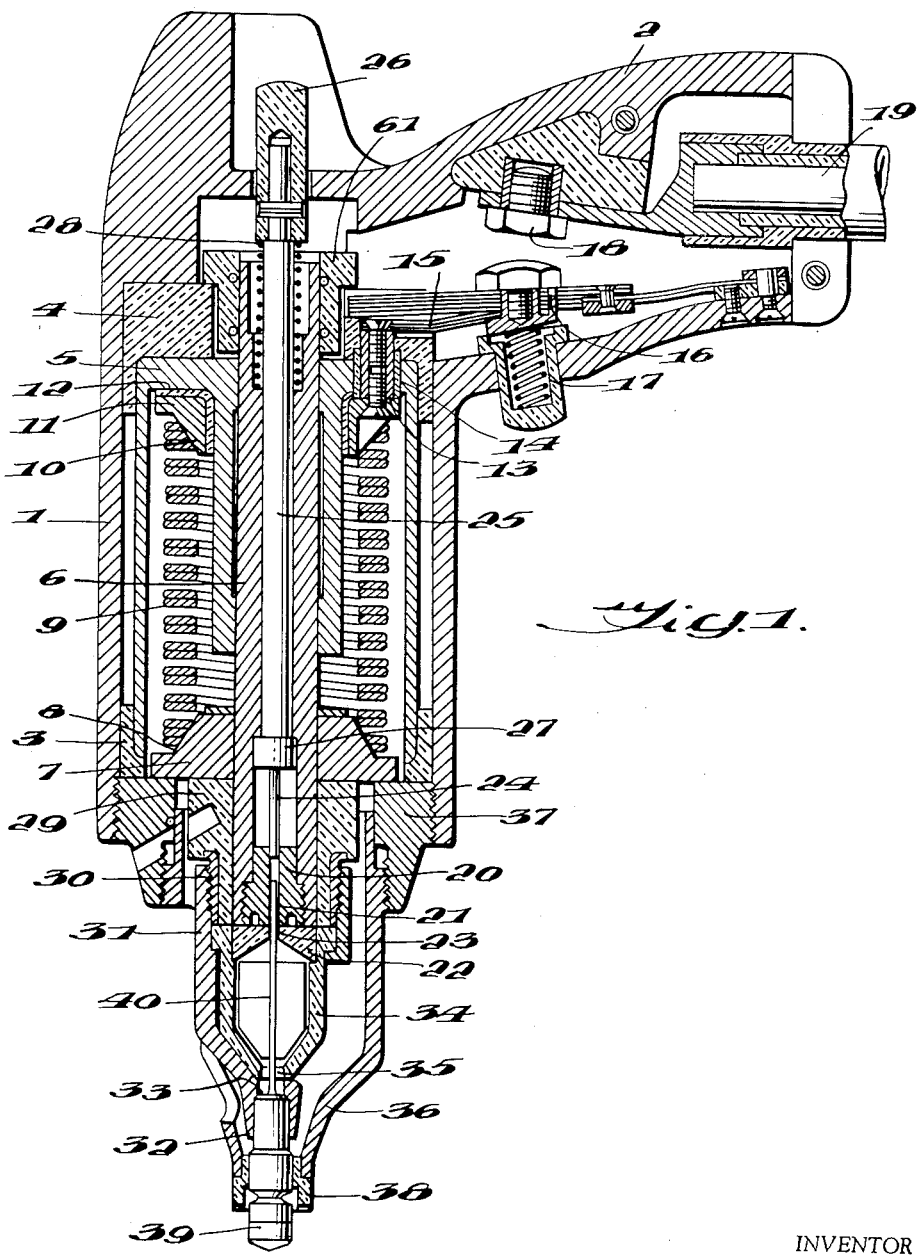

May 22, 1956 K. J. AVERSTEN 2,747,062
ELECTRIC WELDING AND SOLDERING GUN
Filed May 5, 1955 2 Sheets-Sheet 1

INVENTOR
KARL J. AVERSTEN,
BY Larson and Whiting
ATTORNEYS

May 22, 1956  K. J. AVERSTEN  2,747,062
ELECTRIC WELDING AND SOLDERING GUN
Filed May 5, 1955  2 Sheets-Sheet 2
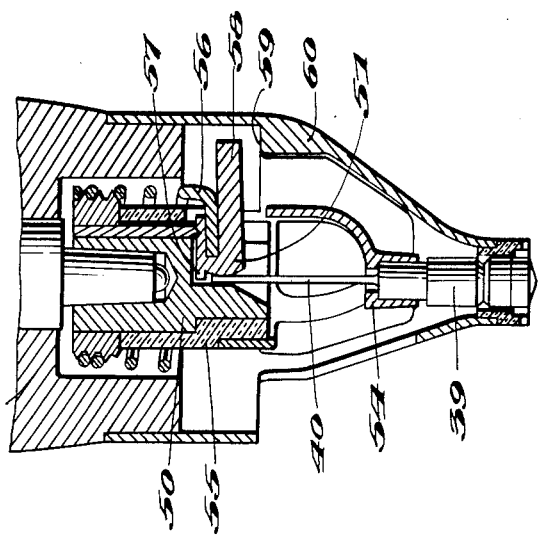
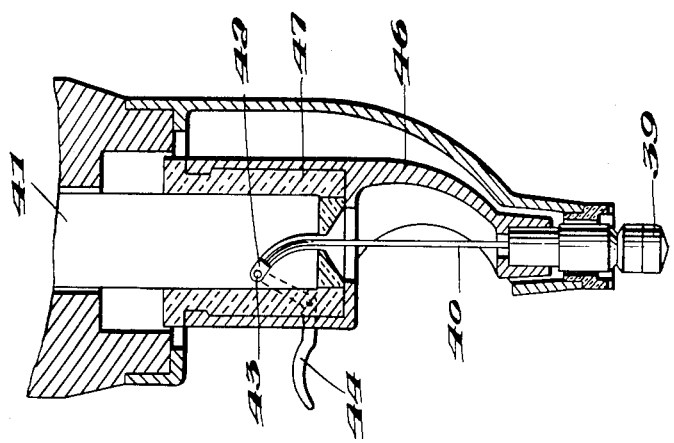
INVENTOR
KARL J. AVERSTEN,
BY Larson and Whiting
ATTORNEYS United States Patent Office 2,747,062
Patented May 22, 1956

2,747,062

ELECTRIC WELDING AND SOLDERING GUN

Karl Joel Aversten, Lidingo, Sweden

Application May 5, 1955, Serial No. 506,319

7 Claims. (Cl. 219—4)

This invention relates to an electric welding and soldering gun and more particularly to such a device in which means is provided for initiating and maintaining an electric arc for a predetermined length of time.

In my prior application Serial No. 258,239, filed November 26, 1951, now Patent No. 2,712,049 issued June 28, 1955, for "Electric Welding and Soldering Gun," I have disclosed a gun which is provided with a reel of fuse wire therein in which a portion of the fuse wire is included in the electric circuit so that the fuse wire melts after a predetermined length of time to halt the electric arc process. The disadvantage in such a system is that, of course, for various sized welding and soldering pins various sized fuse wire is required. Thus, each time a different sized pin is used, the fuse wire reel must be removed and replaced. The present invention overcomes these disadvantages by utilizing pins in which the fuse wire is mounted thereon. A welding or soldering pin having the fuse wire mounted thereon is disclosed in my co-pending application Serial No. 422,224, filed April 9, 1954.

According to the present invention, a welding or soldering gun is provided in which a current supplier is so disposed as to receive the end of the fuse wire on the welding or soldering pin. Switch means is provided so that current may be supplied through the fuse wire and the pin to the metallic surface to which the pin is to be welded or soldered. The welding or soldering current heats the fuse wire until it reaches the melting point at which time the arc will be broken. The presently-disclosed gun also provides means for lifting the pin to form the arc when the current circuit is completed through the pin and the metallic plate. This same means serves to force the pin downwardly into the melted pool of metal after the arcing operation has been ceased. Thus, by virtue of the presently-disclosed apparatus, all of the operations in connection with an electric arc process are performed automatically. The arcing distance is determined by the welding gun and the length of time the operation continues is determined by the time required to melt the fuse wire.

A primary object of the present invention is to provide a welding and soldering gun having means mounted therein to automatically control the length of the arc between the welding or soldering pin and the metallic plate and for maintaining this arc for a predetermined length of time.

Another object of the present invention is to provide a welding or soldering gun in which after the electric arc has been cut off, the pin is forced into the pool of melted metal so as to insure a firm connection between the pin and the metallic plate.

Other objects and many of the attendant advantages of the present invention will become more fully apparent upon consideration of the accompanying detailed specification when taken in connection with the drawings wherein:

Fig. 1 is a longitudinal sectional view through an electric welding and soldering gun according to the present invention, Fig. 2 shows a modification of a holder for a soldering or welding pin, and Fig. 3 shows still another form of chuck for holding the soldering or welding pin.

The pistol, as shown in Fig. 1, possesses a cylindrical housing 1 having a pistol handle extending outwardly at the rear part of the housing 1. Inside the housing 1 there are provided a pair of electrically isolated rings 3 and 4, between which an iron core 5 is disposed. A shaft 6 of non-magnetic material is movable axially in the core 5 and is provided with a flange 7 of magnetizable material having a conical seat 8 for guiding one end of a doubly-wound spring 9. The other end of spring 9 rests against a conical seat 10 on a metallic ring 11 which serves as a guide for spring 9 as well as being a stop therefor. This ring is carried by the iron core 5, but is insulated electrically therefrom by means of an insulating ring 12. The spring 9 is made of a material having good electrical conductivity such as a copper alloy of the type commonly used for electric conductors. The metallic ring 11 is connected by means of a connecting member 13 which extends through an insulting sleeve 14 in the iron core, with a conductor 15 of a contact arm 16. Contact arm 16 can be pressed by means of a knob against a contact 18, the latter contact being connected to a cable 19 which is suitably connected to the current supply. The swinging of the contact arm 16 towards the contact 18 may be prevented by means of an angular stop 61 on the shaft 6 as will be explained more fully hereinafter.

At the center of the outermost end of the shaft 6 there is inserted by means of threads a current supplying member 20 having a circular central aperture. Adjacent the member 20 there is a protective cup 22, which may be made, for instance, of asbestos. Cup 22 is provided with an aperture 23 which is in alignment with aperture 21 in member 20. A cleansing needle 24 extends into the aperture 21 and is mounted on the end of a rod 25, which is slidable in the center of the shaft 6 and is provided with a knob 26, which can be actuated at the rear end of the pistol housing. The rod 25 is movable axially and a collar 27 on the rod limits the displacement thereof in both directions. A helical spring 28 surrounding the part of the rod 25 immediately adjacent the knob 26 serves to hold the rod in the position shown in Fig. 1.

At the outer end of the shaft 6 there is further attached an insulating sleeve 29 having a metallic insert 30. There is attached to insert 30 by means of a thread the base portion 31 of a chuck 32 having a central aperture 33. The base portion 31 also serves to hold a laterally apertured protective cap 34 of Bakelite and the cap holds the protective cup 22 against the end of the shaft 6. The cap 34 also has aperture 35 in alignment with the aperture 33. A support 36 extends upwardly adjacent the chuck 32 and the base portion 31. Support 36 is secured by means of threads in an axially adjustable manner in a stop ring 37, which is secured by means of threads in the front end of the housing 1. In the outer end of the support 36 there is inserted a protective ring 38 of fireproof porcelain.

When it is desired to solder a metallic pin 39 having solder at its front end and a fuse wire 40 at its rear end, the fuse wire is inserted through the chuck 32 and its aperture 33, aperture 35, aperture 23 and into the aperture 21, until the pin 39 is in the position shown in Fig. 1. The cable 19 is assumed to be connected to a current source. If it is now attempted to connect the other electric conductors of the pistol to the cable 19 via the contacts 16, 18, this is not possible, because the angular stop 61 prevents swinging of the contact arm 16 to a sufficient extent for closing the contacts. The pin 39 is pressed by means of the pistol against the point on the workpiece where it is to be soldered until the protective ring 38 rests on the workpiece around the welding point. The pin 39 and the parts on the shaft 6 carrying it as well as the shaft 6 itself has then been displaced a small amount inwardly into the pistol with a corresponding compression of the spring 9. The angular stop 61 has also been displaced from the position of rest against the ring 4 and no longer is an obstacle to movement of the contact arm 16. The knob 17 is then pressed, so that the contacts 16, 18 close and the current flows on through the conductors 15, 13, the spring 9, the shaft 6, the current supplying member 20, the fuse wire 40 and the pin 39 to the workpiece, which is connected to the current source or the ground. When the current passes through the spring 9, which serves as a coil, the iron core 5 is magnetized to a sufficient extent to pull against the action of the spring 9 the shaft flange 7 inwards towards the iron core, as a result of which the pin 39 is lifted off the workpiece several millimeters and an arc is lighted between it and the end of the pin, which starts to melt. During the current flow to the pin the fuse wire 40 is heated and the size of the fuse wire is so chosen that the wire melts through when the pin has melted to the desired extent. The current is thus interrupted and the iron core 5 loses its magnetism, whereby the spring 9 is free to push the shaft flange 7 with the shaft 6 and the chuck 32 with the pin outwardly, resulting in pressing the pin into the melted pool of solder, which is allowed to solidify around the end of the pin. The pistol is taken away and the knob 26 is pressed, which causes the cleansing needle 24 to push out the piece of fuse wire stuck in aperture 21, cleansing the boring. The pistol is then ready for loading with a fresh pin, bolt or the like.

The embodiment shown in Fig. 1 is primarily intended for use when the free outer end of the fuse wire 40 is somewhat corrugated or the like, so that the wire makes good contact with the walls of the aperture 21.

According to the embodiment shown in Fig 2, the current supplying member 41 is provided with an arcuate channel 42 for the end of the fuse wire 40 on the pin 39, so that even a straight piece of wire will be urged into good contact against the walls of the channel 42. In the innermost part of the channel 42 there is a cleansing wire 43 provided on a pivotable arm 44. The outer free end of which is accessible for manual operation, so that the cleansing wire 43 can be forced outwardly in the channel 42. The chuck 46 is carried by an insulator 47 provided on the current supplying member 41.

In the embodiment shown in Fig 3, the current supplying member 50 is provided with a clamping member 51, which presses the end of the fuse wire 40 against the current supplier when metal pin 39 has been inserted in the chuck 54. Chuck 54 is carried on an insulator 55 which is mounted on the current supplier 50. The clamping member 51 is mounted on the end of a spring 56 and is provided with a cleansing needle 57 and an outwardly extending arm 58. Arm 58 is adapted to abut a stop 59 on the supporting sleeve 60 as the current supplier and the chuck are driven outwardly when the pin is pressed into the melted pool of solder. This causes the clamping member 51 to be swung, so that its cleansing needle 57 removes any remaining melted wire portions.

In the embodiments described it was assumed that the rod-shaped metallic object, the pin or the like, was attached by soldering but the present invention could also be used in welding and not only with the aid of an arc but alternatively also by means of electric resistance heating. The only essential is that the metallic object to be welded or soldered have a rod-shaped attachment portion. The chuck may have different forms or shapes according to the shape of the object to be inserted therein.

Although the invention has been described in its preferred embodiments, it will be obvious that these are only exemplary and that a number of modifications or alterations with regard to details are possible within the scope of the invention.

I claim:

1. An electric welding and soldering gun for use with a pin having a fuse wire attached thereto comprising a chuck for engaging the pin, a current carrying member disposed in the gun inwardly from said chuck for engaging the fuse wire and means electrically insulating said current carrying member from said chuck.

2. A gun according to claim 1 said last-named means including an insulating sleeve surrounding the current carrying member, the chuck having a base portion mounted on said sleeve.

3. A gun according to claim 1 said current carrying member comprising a tube, means disposed within said tube for forcing the fuse wire outwardly of the current carrying member.

4. A gun according to claim 1 said current carrying member having an arcuate channel therein, a wire disposed in said channel, an arm attached to said wire extending outside the channel whereby the arm may be moved to displace the wire outwardly of the channel.

5. A gun according to claim 1 said current carrying member including a clamping element to hold the fuse wire against the current carrying member.

6. A gun according to claim 1 including a protective cup mounted on the end of said current carrying member, said cup being of heat-proof material and having a central aperture therethrough for the passage of the fuse wire.

7. A gun according to claim 1 including a double wound helical spring in electrical contact with said current carrying member.

No references cited.